Dec. 26, 1939.        J. H. SHERTS        2,184,876
SAFETY GLASS
Filed June 3, 1936
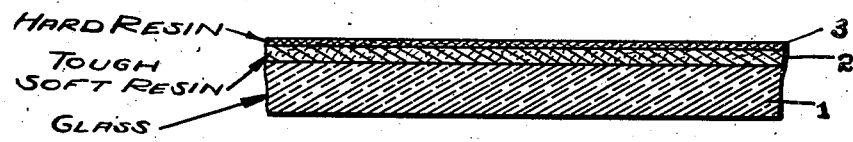
INVENTOR.
JAMES H. SHERTS
BY
ATTORNEYS.

Patented Dec. 26, 1939

2,184,876

UNITED STATES PATENT OFFICE 2,184,876

SAFETY GLASS

James H. Sherts, Tarentum, Pa., assignor to Pittsburgh Plate Glass Company, a corporation of Pennsylvania Application June 3, 1936, Serial No. 83,247

2 Claims. (Cl. 49—92)

The invention relates to safety glass of the type involving a single sheet of glass with a reinforcing on one side thereof of tough, non-shatter material, and designed for use particularly in motor vehicles. This type of safety glass has the advantage over ordinary safety glass that in case of breakage (with the reinforcing on the side next to the occupants of the vehicle) there is no danger of injury due to small detached particles of glass. It also has an advantage as to weight and cost, as compared with ordinary three-ply safety glass. However, the reinforcing heretofore proposed has not been satisfactory, since no reinforcing hard enough to prevent abrasion and clouding with sufficient strength and toughness to meet safety requirements has yet been developed. It is the object of the present invention to overcome this difficulty and provide a reinforcing which has the same strength as the best reinforcing now available in three ply safety glass, and which, at the same time, has a surface of such hardness that it will withstand the abrasion incident to use and to cleaning without becoming marred or clouded. One embodiment of the invention is shown in the accompanying drawing, wherein:

The figure is a section through a sheet of the improved product, the thickness of the layers being much exaggerated for clearness of illustration.

Referring to the drawing, 1 is a glass sheet; 2 is a layer of tough, relatively soft resin; and 3 is a layer of very hard resin which will resist abrasion.

The layer 2 is well plasticized to give the necessary toughness, and is preferably of the type set forth in the application of E. L. Fix, Serial No. 65,599, filed February 25, 1936, namely, a polymerized vinyl acetal resin produced by reacting from 2.5 to 8 moles of poly-vinyl alcohol with 1 mole of a straight chain (saturated) aliphatic aldehyde, such as butyraldehyde. The plasticizer employed in the resin is one of the glycol dihexoates as set forth in said application. If triglycol dihexoate is used, the ratio of plasticizer to resin is preferably about 31 to 69 and if diglycol dihexoate is used, the ratio is about 30 to 70.

The layer 3 is hard and abrasion resisting to avoid marring and clouding in service. It is necessarily substantially free from plasticizer, as plasticizer softens the resin, and for this reason, has a low degree of strength and toughness, as compared with the inner resin layer 2. Preferably it is very thin, as compared with the inner layer and must be of a composition such that it will not absorb plasticizer from the inner layer, as otherwise, its hardness and resistance to abrasion is impaired. A resin having the desired characteristics is a polymerized vinyl acetal formed by reacting 2.5 to 7 moles of poly-vinyl alcohol with 1 mole of formaldehyde. This resin is free from plasticizer and will not absorb the glycol dihexoate plasticizer from the inner resin layer 2. It is very hard and abrasion resisting and will maintain these characteristics indefinitely when imposed on and adhered to the inner layer 2.

In carrying out the process, the vinyl sheet 2 about one-thirty-seconds of an inch in thickness is placed upon the glass sheet 1, and a thin flexible sheet plated with chromium having a polished surface is applied over the resin sheet. This assembly is then subjected to heat and pressure in a platen press to cause adherence between the glass and resin and polish the outer face of the resin sheet. The metal plate is then stripped from the resin which is now ready for the application of the hard resin layer 3. This is preferably applied by placing the resin in solution in a solvent, which is not a solvent of the resin of the sheet 2, such as toluene, and then spraying or flowing the solution over the face of the sheet 2 in one or more layers, the solvent then being removed by exposure to the air or by circulating air thereover with the application of heat to hasten the removal of the solvent. The sheet 3 as thus dried has a polish which can be improved by the use of the chromium plated sheet heretofore described, to which heat and pressure are applied in a press, as described above in connection with the sheet 2. The layer 3 may also be applied in sheet form in a press under heat and pressure using a polished metal plate over the resin to give it a polished surface.

What I claim is:

1. In combination, a plate of safety glass comprising a single glass sheet, a layer of a polymerized incomplete poly-vinyl acetal resin formed by reacting poly-vinyl alcohol with butyraldehyde mixed with a glycol dihexoate as a plasticizer adhered to one face of the glass sheet, and a layer of polymerized incomplete vinyl acetal resin substantially free from plasticizer and formed by reacting poly-vinyl alcohol with formaldehyde adhered to the outer face of the first resin layer.

2. In combination, a plate of safety glass comprising a single glass sheet, a layer of a polymerized incomplete poly-vinyl acetal resin formed by reacting poly-vinyl alcohol with butyraldehyde mixed with a glycol dihexoate as a plasticizer adhered to one face of the glass sheet, and a layer of polymerized incomplete vinyl acetal resin substantially free from plasticizer and formed by reacting 2.5 to 7 moles poly-vinyl alcohol with 1 mole of formaldehyde adhered to the outer face of the first resin layer.

JAMES H. SHERTS.